United States Patent [19]
Koch et al.
[11] 3,805,119
[45] Apr. 16, 1974

[54] SUPERCONDUCTOR

[75] Inventors: Carl C. Koch, Oak Ridge, Tenn.; Gordon Ross Love, Greenville, S.C.

[73] Assignee: The United States of America as represented by the United States Atomic Energy Commission, Washington, D.C.

[22] Filed: July 12, 1972

[21] Appl. No.: 270,881

Related U.S. Application Data

[62] Division of Ser. No. 76,351, Sept. 29, 1970, abandoned.

[52] U.S. Cl. .................... 317/123, 75/174, 335/216
[51] Int. Cl. ... H01h 47/00, H01v 11/12, C22c 27/00
[58] Field of Search ....... 335/216; 317/123; 148/32, 148/32.5; 75/174

[56] References Cited

UNITED STATES PATENTS 3,141,235 7/1964 Lenz ................................ 75/174 X
3,156,560 11/1964 Semmel ................................ 75/174
3,310,398 3/1967 Kneip ................................ 75/174 X

OTHER PUBLICATIONS

Journal of Applied Physics, Vol. 40, No. 9, August 1969, pgs. 3,582–3,587.

*Primary Examiner*—Charles N. Lovell
*Attorney, Agent, or Firm*—John A. Horan; David S. Zachry; Fred O. Lewis

[57] ABSTRACT

A superconductive niobium alloy having the property in the super-conducting state of remaining high-Q in appreciable d.c. magnetic fields, and a method for making the same. The alloy consists essentially of niobium metal and an additive metal dispersed as a second phase therein. The additive metal is gadolinium, yttrium, or a member of the lanthanum series of rare-earth metals.

2 Claims, 3 Drawing Figures

INVENTORS.
Carl C. Koch
Gordon R. Love
BY
[signature]
ATTORNEY.

INVENTORS.
Carl C. Koch
Gordon R. Love
BY
ATTORNEY.

SUPERCONDUCTOR

This is a division of application, Ser. No. 76,351, filed Sept. 29, 1970, now abandoned.

BACKGROUND OF THE INVENTION

This invention was made in the course of, or under, a contract with the United States Atomic Energy Commission.

The extent to which superconductors are useful in alternating-current applications depends in large part on the ability of the superconductor to resist penetration by external magnetic fields. The fields referred to may be generated by the a.c. current in the superconductor itself or may be generated externally. Until field penetration occurs, the superconducting circuit remains high-Q, meaning that it continues to operate with low a.c. power losses. Penetration occurs when the total field at the superconductor surface exceeds the intrinsic critical surface current density, and is reflected in an abrupt decrease in Q. It is the trapped-flux effects accompanying penetration which are responsible for a large part of the residual a.c. losses in the superconductor. Thus, for a.c. applications it is highly desirable that the superconductor be one which remains high-Q in the presence of high magnetic fields.

A convenient way of determining the Q characteristic of a superconductor ($Q = 2\pi$ average energy stored/energy dissipated per half-cycle) is to utilize the superconductor as the coil of a helical resonator which is mounted with its axis perpendicular to a variable d.c. magnetic field. With the conductor operating in the superconducting mode, a plot of Q versus the applied magnetic flux density is obtained by adjusting the applied field strength to selected values and determining the corresponding Q values by measuring the rate of decay of an applied voltage pulse. The resulting curve relating Q and flux density is the Q characteristic of the superconductor. In the following description, a circuit so tested is considered to be high-Q so long as its Q exceeds one-half of its zero-magnetic-field value.

Accordingly, it is an object of this invention to provide an improved superconductive niobium alloy having the property in the superconducting state of remaining high-Q in the presence of d.c. magnetic fields of comparatively high flux density.

It is another object to provide an improved a.c. circuit utilizing the high-Q superconductor described herein.

It is another object to provide a method for making the above mentioned superconductive niobium alloy.

Other objects of this invention will become apparent from the following description and claims.

SUMMARY OF THE INVENTION

In accordance with this invention, niobium metal and an additive metal are co-melted in a non-oxidizing atmosphere, following which the resulting melt is solidified to form an alloy consisting essentially of niobium and a dispersion of the additive metal. The additive metal is selected from the group consisting of gadolinium, yttrium, and a member of the lanthanum series of rare-earth metals. The resulting niobium alloy is superconductive and has the property in the superconducting state of remaining high-Q in appreciable d.c. magnetic fields. Consequently, electrical circuit elements composed of the alloy operate in the superconducting state with comparatively low residual a.c. losses.

DESCRIPTION OF THE PREFERRED EMBODIMENTS

Figure 1:
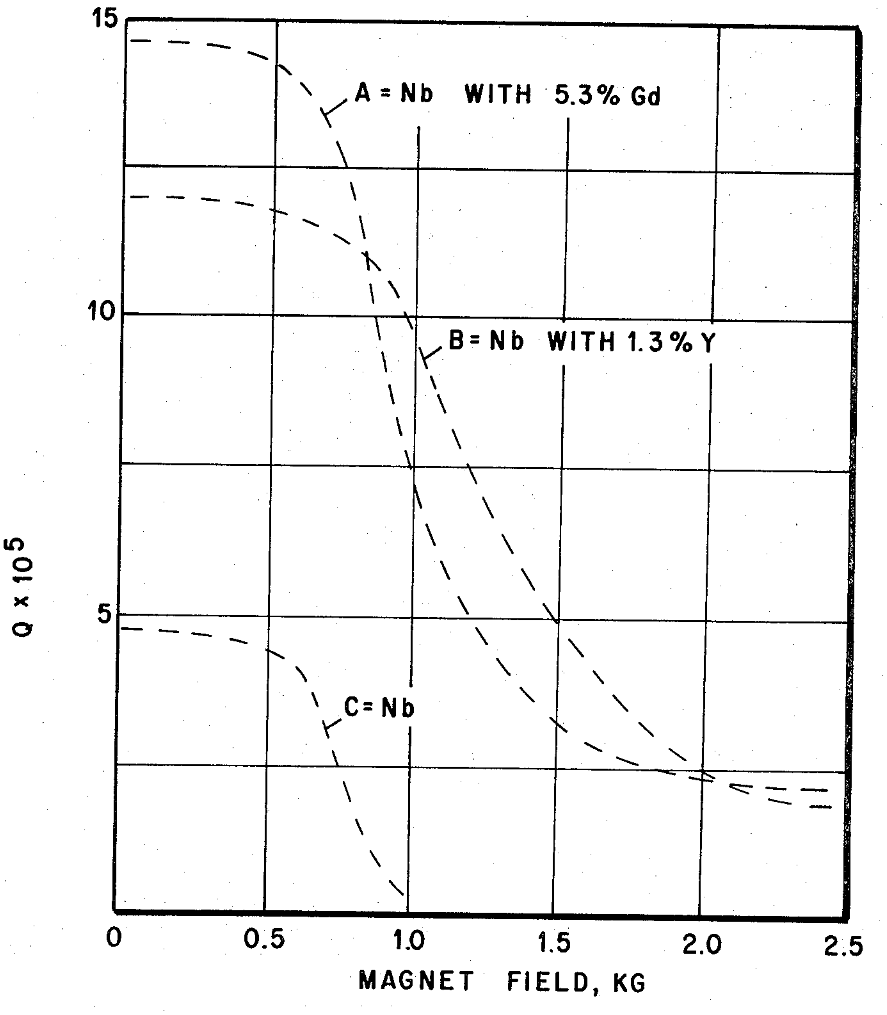
FIG. 1 is a graph correlating Q and d.c. magnetic field flux density for a pure niobium superconductor and for two niobium-alloy superconductors produced in accordance with this invention.

In accordance with our invention, niobium and a selected metal additive are co-melted in a non-oxidizing atmosphere. Preferably, both the niobium and the additive are of high purity. The additive is selected to have a negligible solubility in niobium at room temperature, so that the additive forms a dispersion upon solidification of the melt. The resulting alloy, comprising a niobium metal matrix containing a dispersion of the additive, remains high-Q in higher d.c. magnetic fields than does pure niobium.

The above-mentioned additive comprises at least one metal of the class consisting of gadolinium, yttrium, and the lanthanum series of rare earths (elements with atomic numbers 57 through 71). The additive is co-melted with the niobium in an amount ensuring that the resulting dispersion of the additive will comprise from about 0.5 to 10 atom percent of the alloy. Rapid solidification of the melt is preferred in order to limit the size of the dispersed particles. Preferably, the dispersion has an average particle diameter of less than about 3 microns. We have found that cold-working of the niobium alloy effects some improvement in its ability to remain high-Q in d.c. magnetic fields.

The following examples are presented to illustrate our invention in detail.

EXAMPLE I

A niobium-5.3 atom percent gadolinium alloy was prepared, using high-purity niobium which had been electron-beam melted at a pressure of $10^{-8}$ Torr. The interstitial analysis for the niobium was as follows: C, 40 ppm; $H_2$, 2 ppm; $N_2$, 52 ppm; $O_2$, 62 ppm. The purity of the gadolinium was 99.9 percent as determined by the supplier. The niobium and gadolinium were arc-melted in a furnace which had been evacuated to less than $10^{-7}$ Torr and then back-filled with a partial pressure of argon. The alloy was turned and re-melted six times to ensure homogeneity, the melt being quenched on a water-cooled copper hearth. The final melt was cast into finger molds. Samples of the cast alloy were cold-swaged to reduce the diameter by 85 percent. Photomicrographs of a longitudinal section of the cold-worked alloy showed a generally homogeneous structure. The diameters of the dispersed gadolinium particles ranged from 0.2 to 6 microns, as determined by optical metallography; the mean diameter was about 1.0 micron. Various tests established that essentially all of the gadolinium was in the dispersed phase, with little or none being dissolved in the niobium. It was found, for example, that the superconducting transition temperature for the alloy was the same as for pure niobium, within the resolution of the measurement ($T_c = 9.10 \pm 0.02°K$). Other tests established that the gadolinium dispersion produced large hysteresis in magnetization and large critical current densities. The magnetic susceptibility of the alloy was determined at 77°K; the alloy was found to be ferromagnetic, as is elemental gadolinium.

Samples of the cast alloy were swaged into 19-mil wire, which was wrapped on a teflon rod to form a 520 MHz helical resonator. A loosely coupled normal shield can was used. A d.c. magnetic field was applied perpendicular to the axis of the helical winding, and a conventional pulse-decay technique was employed to determine Q for various values of the applied magnetic field, the resonator being operated in the superconducting mode (temperature, 4.2°K).

As shown in FIG. 1, curve A, the circuit Q was found to drop to one-half of its zero-field value at a flux density of about 1,000 gauss. Curve C shows that when a pure-niobium winding was substituted, the circuit Q dropped to one-half of its zero-field value at about 780 gauss. Thus, the circuit utilizing the niobium alloy conductor remained high-Q in an appreciably higher d.c. field. Tests of the magnetization properties of the alloy indicated that less improvement is obtained if the cold-worked alloy is annealed, as by heating for one hour at 1,200°C at a pressure of $10^{-8}$ Torr.

EXAMPLE II

Figure 2:
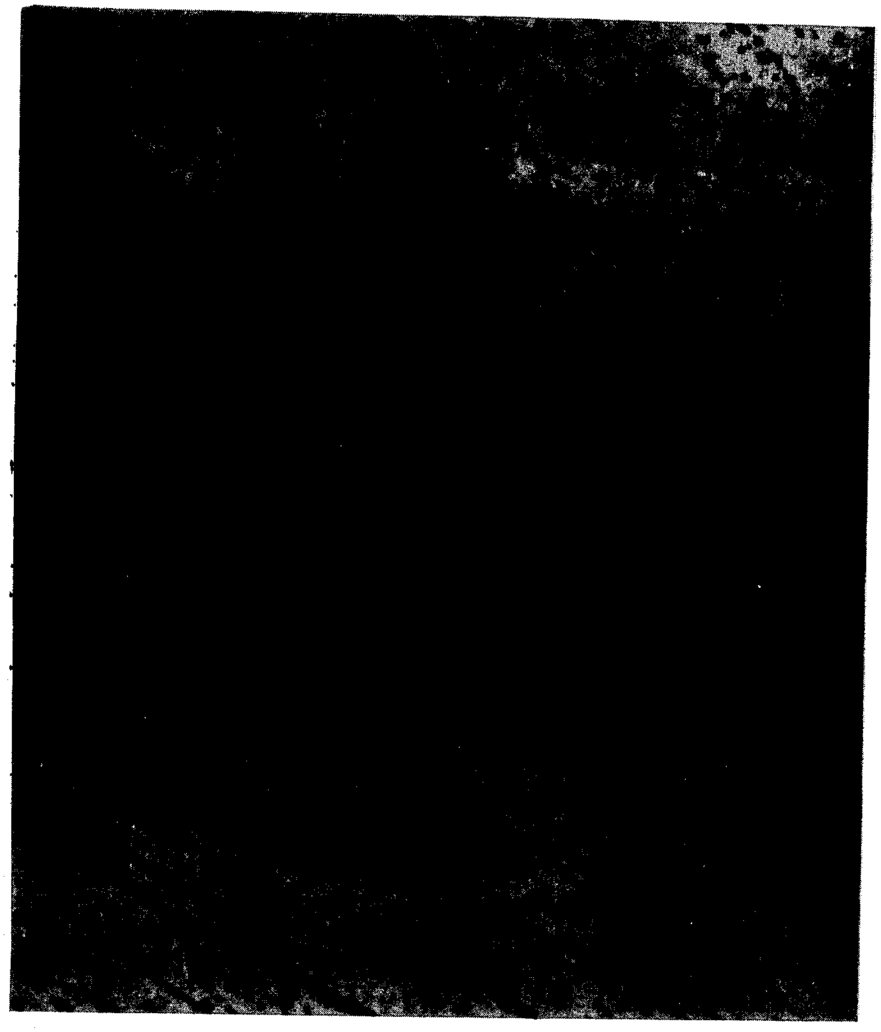
FIG. 2 is a photomicrograph (magnification, ~600X) of longitudinal longituidnal section of a cold-worked alloy material consisting of a niobium matrix and a dispersion of yttrium particles, the yttrium comprising 1.3 atom percent of the alloy.

Using the process just described, high-purity niobium of the kind discussed in Example I was combined with 99.9 percent-pure yttrium to produce a superconductive alloy consisting of a niobium matrix and a dispersion of yttrium in the amount of 1.3 atom percent. The microstructure of this alloy after cold-swaging 85 percent is shown in FIG. 2. It is generally similar to that of the gadolinium dispersion of Example I, with the exception that the yttrium particles appear to elongate more during deformation and to delineate the grain boundaries to a somewhat greater extent. The diameters of the yttrium particles ranged from about 0.1 to 3 microns, the mean diameter being about 0.5 micron. Tests indicated that the dispersion consisted predominantly of pure yttrium, with little or none of the additive being dissolved in the niobium matrix.

The niobium-yttrium alloy was cold-swaged to form 19-mm wire, which was tested in the helical resonator arrangement described above. Curve B, FIG. 1, shows the results obtained under the conditions described in Example I. In this instance the circuit Q dropped to one-half of its zero-field value at a flux density of about 1,200 gauss. Measurements of the magnetization properties of the alloy showed that the amount of improvement in the high-Q characteristic is reduced if the cold-worked alloy is annealed, as under the conditions given in Example I.

Tests established that the yttrium-containing alloy was characterized by a magnetization curve ($-4\pi M$ versus H) which was qualitatively similar to that for the gadolinium-containing alloy described in Example I.

EXAMPLE III

A niobium-2 atom percent lanthanum alloy was produced by the method described in Example I. The alloy melt was cast into molds and subsequently cold-swaged 85 percent. Examination of the swaged material showed that the lanthanum had formed a dispersed second phase, the particles in the dispersion having diameters in the range of from about 0.1 to 3 microns and a mean diameter of about 0.5 micron. The superconducting transition temperature of the alloy was found to be the same as that for pure niobium, indicating that lanthanum has a low solubility in niobium.

Tests established that the lanthanum-containing alloy was characterized by a magnetization curve qualitatively similar to those obtained with the alloys described in Examples I and II, showing that lanthanum also can be dispersed in niobium to improve its high-Q characteristic.

It will be apparent that the other members of the lanthanum series of rare earths likewise are useful in this application, since they are chemically very similar to lanthanum, not only in terms of solubility in niobium but in terms of various other properties.

EXAMPLE IV

A niobium-0.5 atom percent Gd alloy was prepared, cast, and cold-swaged as described in Example I. The dispersed particles were essentially identical in size to those of the Nb-5.3 Gd, Nb-1.3Y composites. The magnetization curves ($4\pi M$ versus H) and critical current densities were closely similar to those of the above-described alloys, indicating an improvement in the high-Q characteristic.

In preparing our superconducting alloys we prefer that the additive comprise from about 0.5 to 10 atom percent of the alloy. Smaller concentrations of the additive do not improve the high-Q characteristic significantly, whereas larger amounts are undesirable because they promote "proximity effects," meaning essentially that the electro-magnetic properties of the paramagnetic or ferromagnetic particles and the superconducting matrix become "averaged" if the percentage of particles becomes large, thus decreasing the fundamental superconducting properties ($T_c$, $H_{c2}$). While in practice there does not appear to be a lower limit on the size of the dispersed particles, it is preferred that the mean diameter of the particles not exceed about 3 microns and that a minimum of the individual particles exceed that diameter. If the mean diameter of the particles appreciably exceeds about 3 microns, their flux-pinning effectiveness decreases; this is reflected in a decrease in Q. The mean diameter of the particles can be controlled, within limits, by varying the extent to which the melt is agitated prior to solidification and by varying the quenching rate.

As mentioned, we prefer that the additive be virtually insoluble in niobium at room temperature. This criterion is met by gadolinium, yttrium, and the lanthanum series of rare earths. Dissolution of the additive in the niobium matrix is undesirable because this changes the properties of the superconducting metal. It will be understood that the rare earths of the lanthanum series vary to a minor extent with respect to solubility in niobium, and that they will effect somewhat different amounts of improvement in the high-Q characteristic.

Referring to the matrix metal, we prefer that the niobium starting material be of high purity. By this we mean niobium having a purity corresponding to that of niobium metal which has been exposed to a pressure lower than about $10^{-7}$ Torr during melting and solidification. For example, the niobium referred to in Example I was prepared by electron-beam melting at a pressure of $10^{-8}$ Torr. As indicated in that example, even high-purity niobium contains some nonmetallic impurities, such as nitrogen and oxygen. A fraction of our metal additive will combine with such impurities and precipitate them. However, all but a small percentage of the dispersed additive is in the elemental state. In the niobium-5.3 atom percent gadolinium alloy of Example I, for instance, about 97 percent of the gadolinium is present as the element.

Figure 3:
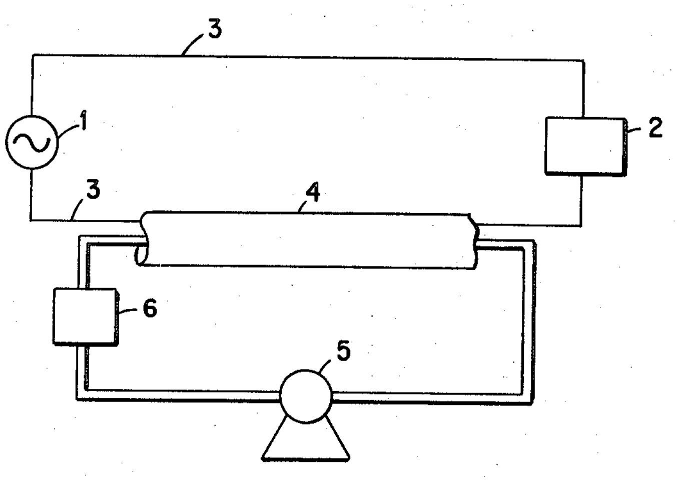
FIG. 3 is a schematic diagram of a typical a.c. circuit utilizing a niobium alloy superconductor of the kind described herein.

Because of their low a.c.-loss characteristic, our superconductors can be used to advantage in a variety of a.c. applications. An improved superconducting a.c. circuit utilizing our superconductors is illustrated in its simplest form in FIG. 3, which shows an a.c. supply 1 connected to a load 2 by means of a cable 3 formed of one of our superconducting alloys. The cable 3 is mounted in an insulated housing 4 through which a cooling medium such as liquid helium is circulated by means of a pump 5. The cooling medium is maintained at superconducting temperature by means of a standard refrigeration station 6. If desired, the load 2 may be composed of the superconductor.

It will be understood that our superconducting alloy is not limited to power-transmission applications but can be used in a variety of circuits operating at various frequencies. For example, our alloy may be useful in circuits utilizing superconducting resonance cavities for the acceleration of fundamental particles.

What is claimed is:

1. An improved a.c. circuit comprising an a.c. power supply and a conductive loop connected across said supply, said loop including a superconductive circuit element formed of an alloy consisting essentially of niobium metal and from about 0.5 to 10 atomic percent an additive metal dispersed therein predomanently in the elemental state as a second phase, the mean diameter of said second phase being below about 3 microns, said additive metal being selected from the group consisting of yttrium, gadolinium, and the lanthanum series of rare earth elements having atomic numbers from 51 to 71, inclusive.

2. A superconductive electrical circuit element formed of an alloy consisting essentially of niobium metal and from about 0.5 to 10 atomic percent an additive metal dispersed therein predominantly in the elemental state as a second phase, the mean diameter of said second phase being below about 3 microns, said additive metal being selected from the group consisting of yttrium, gadolinium, and the lanthanum series of rare earth elements having atomic numbers from 51 to 71, inclusive.

* * * * *